United States Patent
Lopatinsky et al.

(10) Patent No.: US 7,112,910 B2
(45) Date of Patent: Sep. 26, 2006

(54) BRUSHLESS DC ELECTRIC MOTOR

(75) Inventors: Edward Lopatinsky, San Diego, CA (US); Daniel Schaefer, Palm Desert, CA (US); Savely Rosenfeld, San Diego, CA (US); Lev Fedoseyev, El Cajon, CA (US)

(73) Assignee: Rotys Inc., San Diego, CA (US)

( * ) Notice: Subject to any disclaimer, the term of this patent is extended or adjusted under 35 U.S.C. 154(b) by 277 days.

(21) Appl. No.: 10/183,032

(22) Filed: Jun. 26, 2002

(65) Prior Publication Data

US 2003/0020353 A1    Jan. 30, 2003

Related U.S. Application Data

(60) Provisional application No. 60/301,229, filed on Jun. 26, 2001.

(51) Int. Cl.
H02K 3/26    (2006.01)

(52) U.S. Cl. ............... 310/268; 310/156.32; 310/184; 310/254; 310/DIG. 6

(58) Field of Classification Search ........... 310/268, 310/DIG. 6, 179–208, 254, 258, 142, 140, 310/141, 156.38; 336/223, 156.32; 318/600, 318/661
See application file for complete search history.

(56) References Cited

U.S. PATENT DOCUMENTS

| | | | | |
|---|---|---|---|---|
| RE25,305 E | * | 12/1962 | Haydon | 310/268 |
| 3,096,455 A | * | 7/1963 | Hahn | 310/268 |
| 4,553,075 A | * | 11/1985 | Brown et al. | 318/254 |
| 4,658,162 A | * | 4/1987 | Koyama et al. | 310/68 R |
| 4,677,332 A | * | 6/1987 | Heyraud | 310/184 |
| 4,961,017 A | * | 10/1990 | Kakinoki et al. | 310/71 |
| 5,510,663 A | * | 4/1996 | Van Loenen | 310/179 |
| 5,616,974 A | * | 4/1997 | Yamada | 310/68 B |
| 5,644,183 A | * | 7/1997 | Van Loenen et al. | 310/268 |
| 5,691,683 A | * | 11/1997 | Allwine, Jr. | 335/306 |
| 5,874,881 A | * | 2/1999 | Steinbusch | 335/222 |
| 6,005,324 A | * | 12/1999 | Kim | 310/268 |
| 6,194,798 B1 | * | 2/2001 | Lopatinsky | 310/63 |
| 6,424,069 B1 | * | 7/2002 | Pullen et al. | 310/156.38 |
| 6,608,411 B1 | * | 8/2003 | Horng et al. | 310/68 R |
| 6,628,038 B1 | * | 9/2003 | Shikayama et al. | 310/268 |
| 6,664,673 B1 | * | 12/2003 | Lopatinsky et al. | 310/63 |

FOREIGN PATENT DOCUMENTS

| | | | |
|---|---|---|---|
| JP | 55-02390 | * | 1/1980 |
| JP | 57-116325 | * | 7/1982 |
| JP | 60131065 | * | 7/1985 |
| JP | 08-336257 | * | 12/1996 |
| JP | 2000-354350 | * | 12/2000 |
| WO | WO-03/003547 | * | 6/2002 |
| WO | WO03/003547 | * | 1/2003 |

* cited by examiner

Primary Examiner—Burton Mullins

(57) ABSTRACT

An electric motor comprises a housing, a magnetic rotor and a stator which comprises at least one circuit board. The magnetic rotor comprises a disk with circumferentially arrayed magnetic poles. The circuit board on each side comprises one layer of circumferentially arrayed coil windings arranged in pairs, thus each pair made as a spiral that extends from a center of a start coil winding to a center of an end coil winding with the same turn direction of the spiral in relation to each of centers. The layers are the same in transparent view and shifted angularly in such a way thus centers of the start coil windings from one side of the circuit board coincided and electrically connected by via's with centers of the end coil windings on the other side of the circuit board.

8 Claims, 11 Drawing Sheets

BRUSHLESS DC ELECTRIC MOTOR

CROSS-REFERENCE TO RELATED APPLICATIONS

The present application claims the benefits of priority of the U.S. Provisional Patent Application Ser. No. 60/301,229 filed Jun. 26, 2001 for Edward Lopatinsky et al. the entire content of which is incorporated herein by reference.

FIELD OF THE INVENTION

The invention is related to electric engineering, and in particular electromagnetic machines, and may be used in the manufacture of electric drives for various purposes, e.g. ventilation, compressors, pumps, wheels of electrically driven automobiles etc.

BACKGROUND OF THE INVENTION

Well-known are machines of end-face rotor-stator interaction type, where the rotor is a disk, on the end surfaces whereof permanent magnets of alternating polarity are located over the circumference. The stator of such machines is made in the shape of a disk (ring), installed coaxially with the rotor, electromagnetic stator coils being located at the end faces of the stator. For instance, the direct current brushless electric motor (electric drive) described in U.S. Pat. No. 5,440,185, IPC 6H02K 21/12 belongs to this type of electric machines. The known device includes at least one rotor installed on the shaft and made as a multi-pole magnetic disk consisting of sections spaced along the circumference, where the polarity of the sections alternates. The device also includes at least one disk-shaped stator element, determining the rotor position, the device for mounting the rotor (rotors) and stator element (elements) on the common axle, the sensor for positioning the multi-pole magnetic disk versus the stator element and a device to identify the magnetic field profile in the stator elements. Two windings are wound over the stator elements, electric current being fed to one of those thus determining the polarity of the stator poles. The known device is not easy in manufacturing, the biggest difficulty being manufacturing of disk-shaped rotors with magnetic poles of alternating polarity.

It is known electric drive, the rotor whereof is made of two disks mounted on a shaft with poles distributed over the outer circumference and a cylindrical magnet located between the disks and magnetized in the axial direction, in such a manner that the poles of each disk are the like ones, and in regard to the poles of the other disk—the unlike ones, the stator being made of coils distributed over the circumference, while in accordance with the invention the rotor poles are formed by the teeth located over the outer circumference of both disks in planes perpendicular to the axis of the device, and the poles of the stator coils are arranged in such a way as to allow for their end-face interaction with the rotor poles, the rotor of the device being the subject of the U.S. application Ser. No. 09/621,104 of the same Assignee has no claw-shaped pole horns (poles). The rotor poles are formed by the teeth located over the outer circumference of both disks, which function as magnetic circuits. This ensures streamlined manufacturing of the rotor and its structural strength. The rotor poles are located over the outer circumference of both disks in planes perpendicular to the axis of the device, and the poles of the stator are arranged in such a way as to allow for their end-face interaction with the rotor poles, there arises an opportunity to make the radial size of the device smaller the stator poles may be located in the space between the above-mentioned rotor poles outfitted on both disks. This will make it possible to raise the power of the drive, as the magnetic field in the space between the rotor poles will have the highest intensity. Prior art motor-fans combinations occupy a large space because of the two separate components, the motor and impeller. The present invention utilizes two stator circuit boards in conjunction with a magnetized impeller that requires less space. This new design should result in a more simplified construction and assembly process and yield a reduction in production costs.

SUMMARY OF THE INVENTION

It is an object of the present invention to provide a new brushless DC electric motor and integrated brushless DC electric motor/blower or motor/pump combination as two possible configurations of this design. This electric motor in combination with an impeller for blowers or pumps is capable of significantly reducing an overall height thereof.

To realize this object, the motor of the present invention is comprised of: a stator comprising circuit board or boards, rotor or rotor/impeller, a housing and a controlling device.

DESCRIPTION OF THE PREFERRED EMBODIMENTS

The following is a description of a new brushless DC electric motor design using printed circuit boards for coil windings. We will refer to these printed circuit boards hereafter as circuit boards throughout this description. The magnetic rotor is made of a permanent magnet material and may be a monolithic part or an assembly having like magnetic poles. This monolithic part or assembly will be referred to hereafter as a magnetic rotor or blower impeller. The following brief description is broken into six parts: Circuit Board, Magnetic Rotor, Motor Description, Integrated Motor/Blower, Controlling Device and Operation Description.

Circuit Board

Figure 1A:
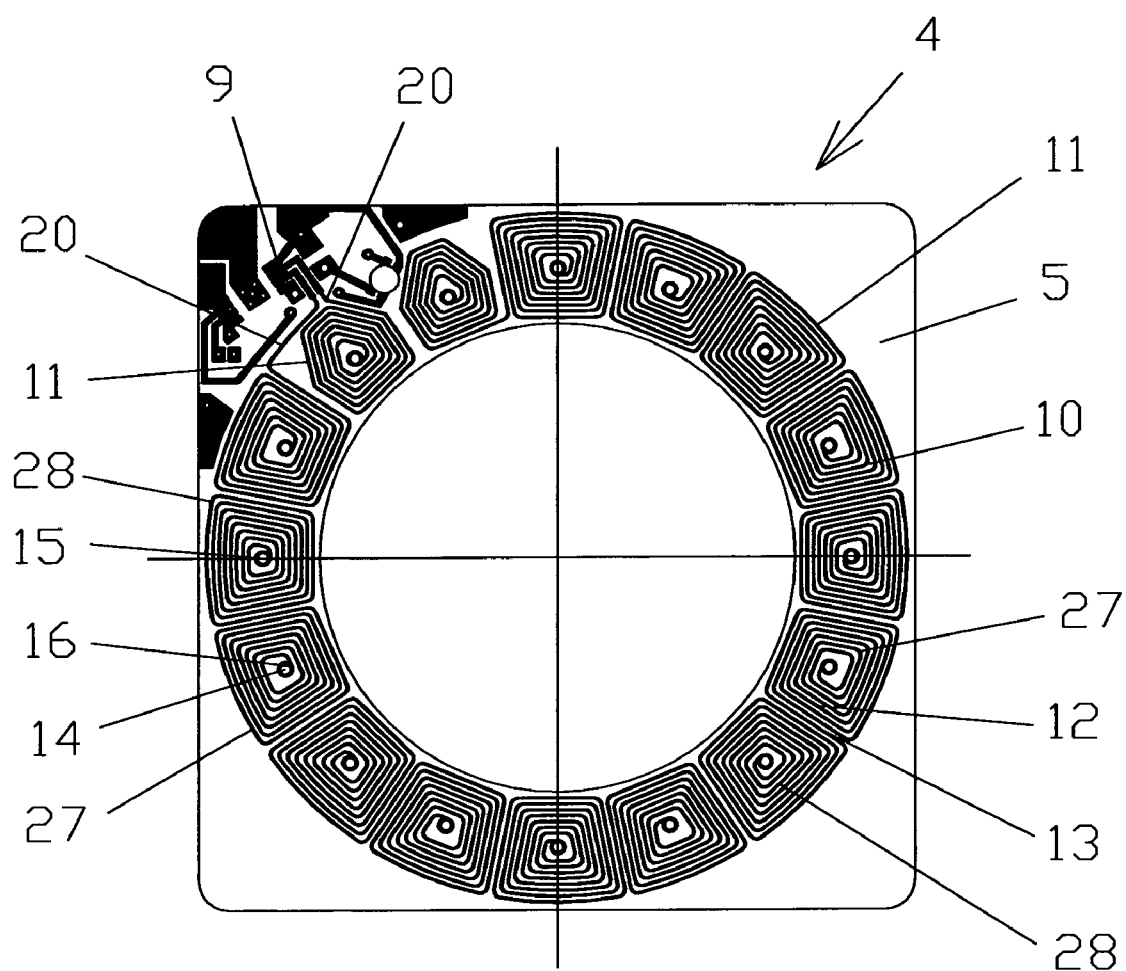
FIG. 1A, 1B is a plane view of the coil windings on one side of a circuit board and a transparent plane view of the coil windings on the other side, respectively.
Figure 1B:
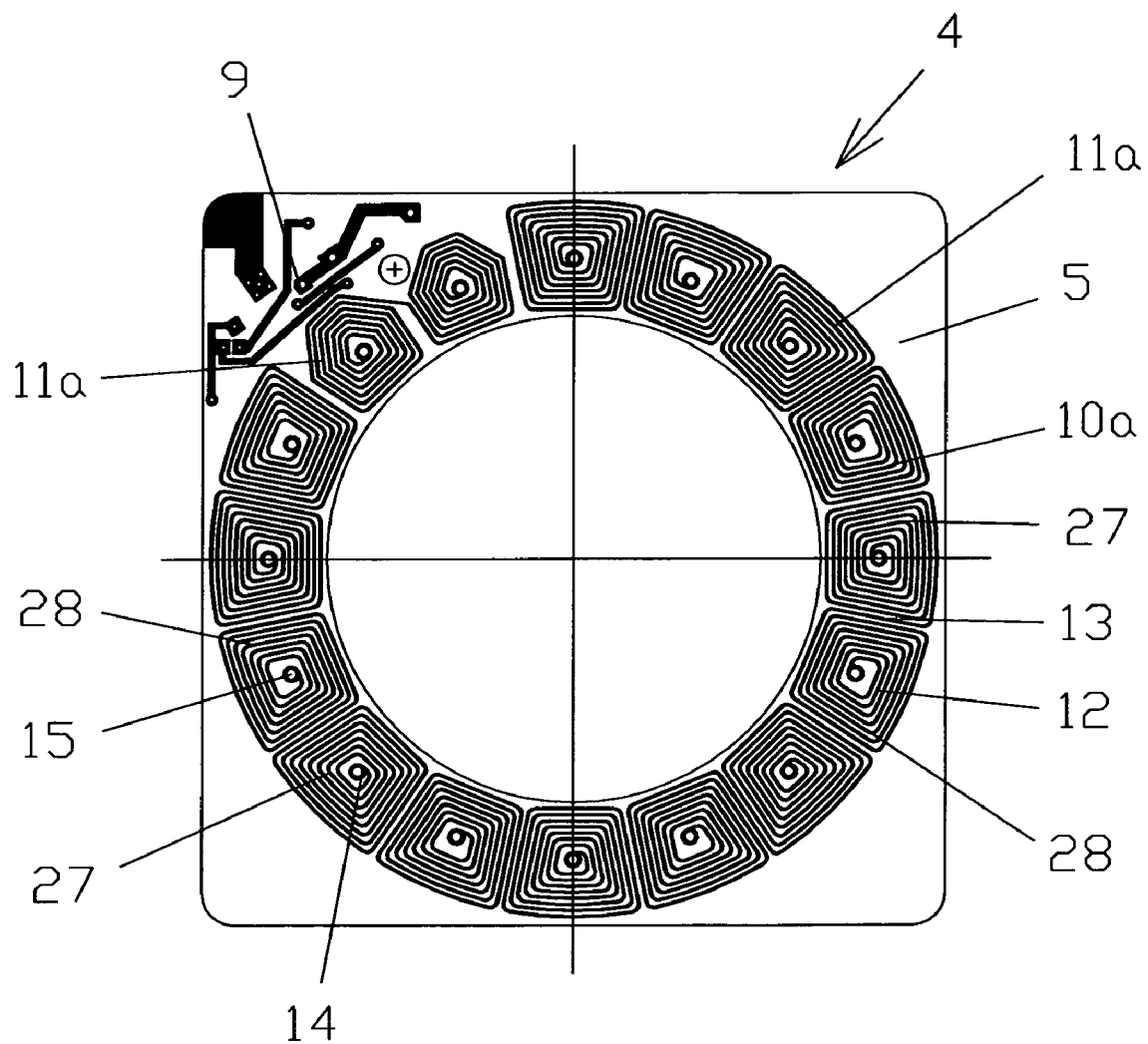

This described circuit board is constructed for use with an H-Bridge Drive controller. FIG. 1A illustrates a front side of a stator 4 that contains coil windings 11 etched from metal, usually copper, on a circuit board 5 and located around the circumference of the stator 4. FIG. 1B illustrates a back (transparent) side of the stator 4 that contains coil windings 11a etched from metal, usually copper, on a circuit board 5 and located around the circumference of the stator 4. In FIG. 1A one of the coils windings 11 is interrupted (broken) for providing power leads 20 to the controlling device 9. Two leads 20 from each of the stator 4 can be connected parallel or series to one another.

Figure 2A:
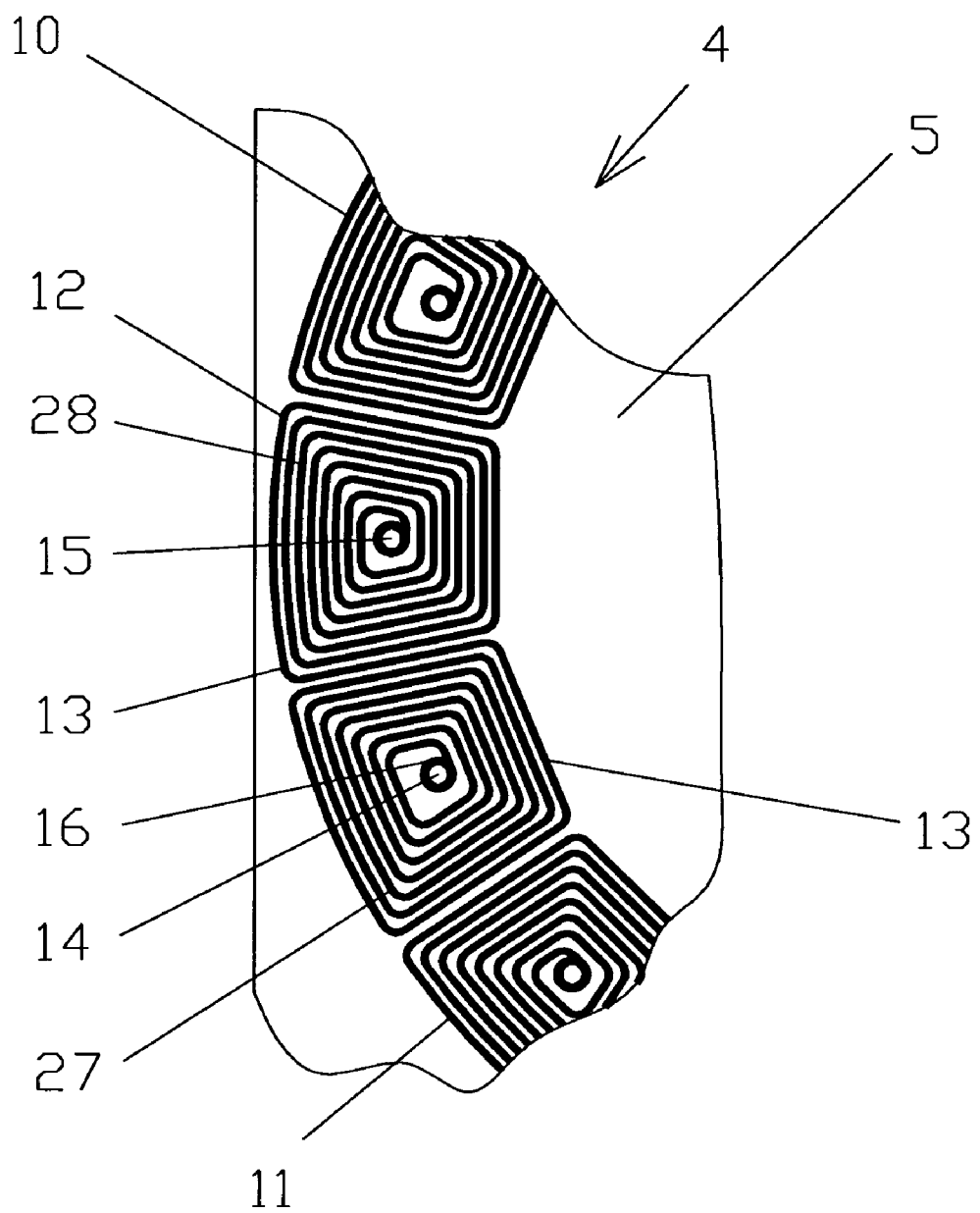
FIG. 2A, 2B is an enlarged plane view of a part of the coil windings on circuit board 1A and 1B, respectively.
Figure 2B:
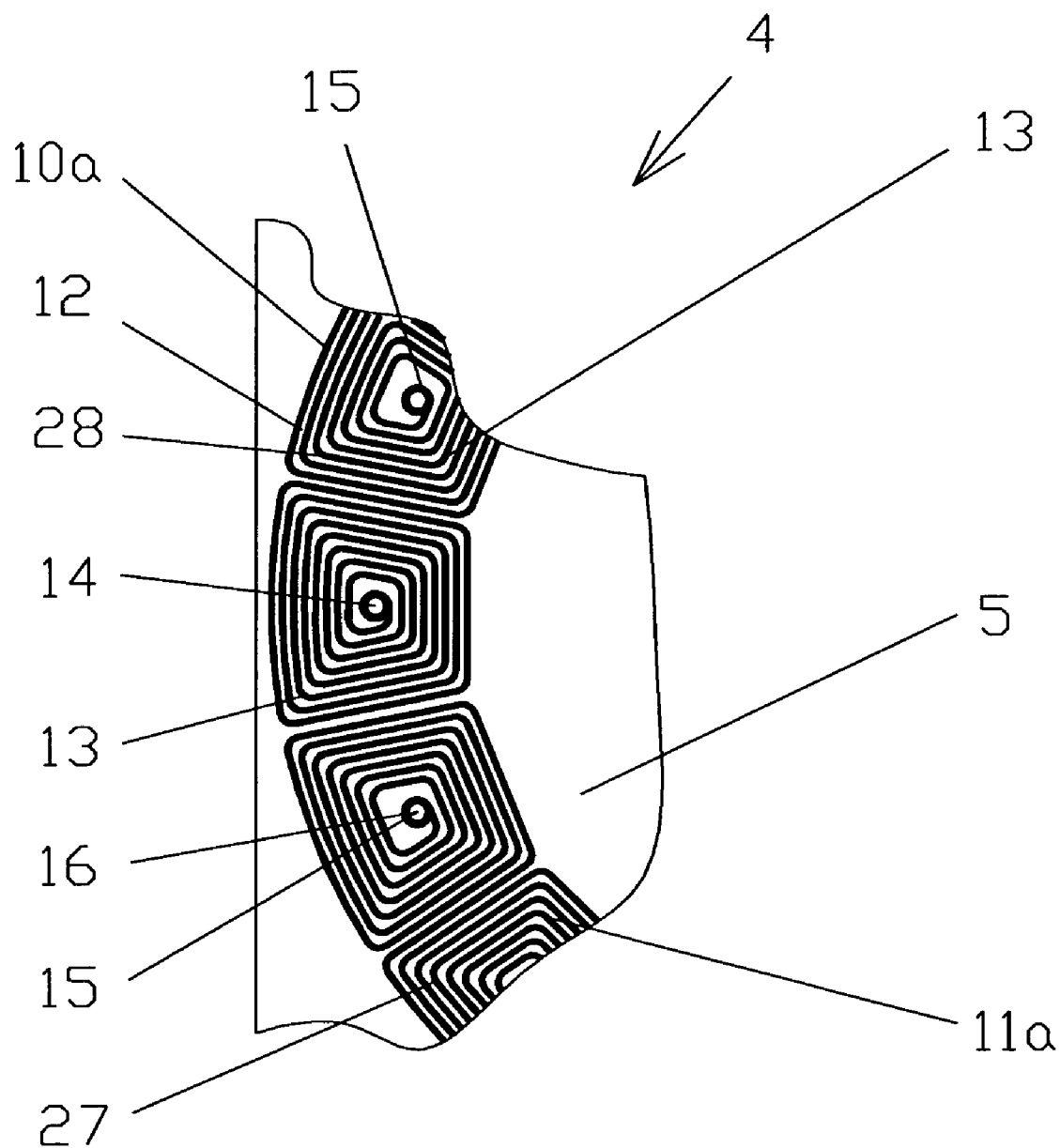

FIG. 2A illustrates a section of the front side and FIG. 2B illustrates a section of the backside (transparent) of the stator 4 on FIGS. 1A and 1B, respectively. Two layers 10 and 10a of coil windings 11 and 11a are formed on each side of the circuit board 5. Each of these layers 10 and 10a comprises arranged in pairs 12 of coil windings 11 and 11a and each pair 12 made as a spiral 13. In FIG. 2A the spiral 13 extends from the center 14 of the start coil winding 27 to the center 15 of the end coil winding 28 with the same turn direction of the spiral 13 in relation to the both centers 14 and 1S. Both layers 10 and 10a of coil windings 11 and 11a are the same in the transparent view and shifted angularly in such a way that the center 14 of the start coil winding 27 from one side of the circuit board 5 is electrically connected through circuit board 5 by internal via's 16, which are copper plated holes, with the center 15 of the other side of the circuit board 5. Coil winding 11a is connected in the same fashion as coil winding 11 on the front side of the circuit board 5. All coil windings 11 and 11a around the circuit board 5 are interconnected in this fashion creating a continuous series of the coil windings 11 and 11a. These coil windings 11 and 11a can be nickel gold plated which allows the magnetic poles 8 on the magnetic rotor 3 (FIGS. 3–9) to align with them for proper motor startups (Nickel is ferromagnetic at temperatures below 627 degrees Kelvin).

Magnetic Rotor

Figure 3:
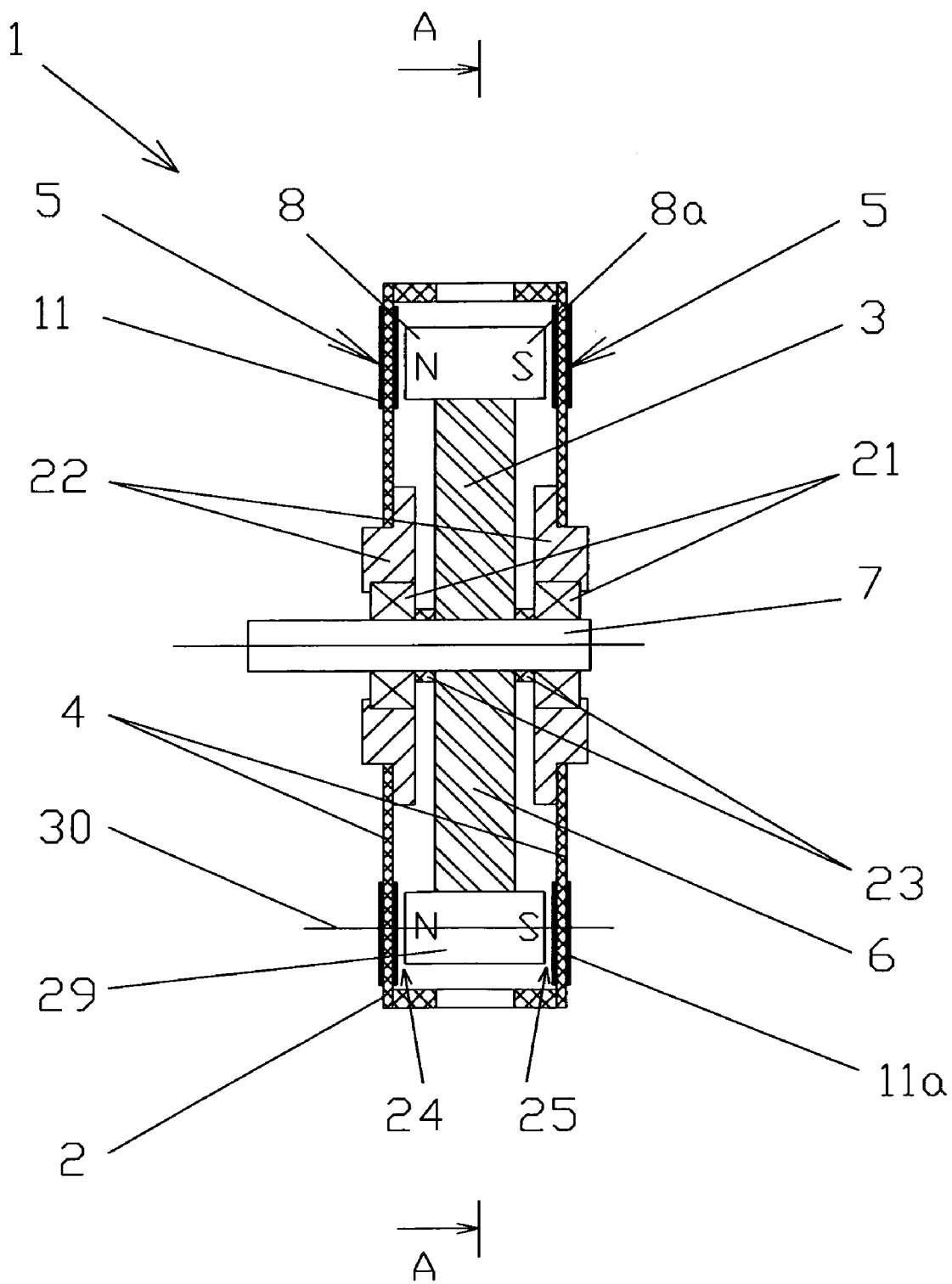
FIG. 3 is a sectional view of an electric motor.

The magnetic rotor 3, illustrated in FIG. 3, can be made from a magnetic plastic material or some other permanent magnet material or a non-magnetic material with permanent magnets 29 imbedded in or attached to it. It is comprised of a disk 6 mounted parallel to circuit boards 5 and perpendicularly to the shaft 7. It is centrally located between the circuit boards 5 and separated from them by gaps 24, 25. Even numbers of magnets 29 are affixed to and distributed around the circumference, preferable outer circumference of disk 6, with equal spacing between each adjacent magnet 29. The magnetic poles 8, 8a of all individual magnets 29 are aligned in the axial direction and have the same magnetic polarity on one side of the disk 6.

Figure 4:
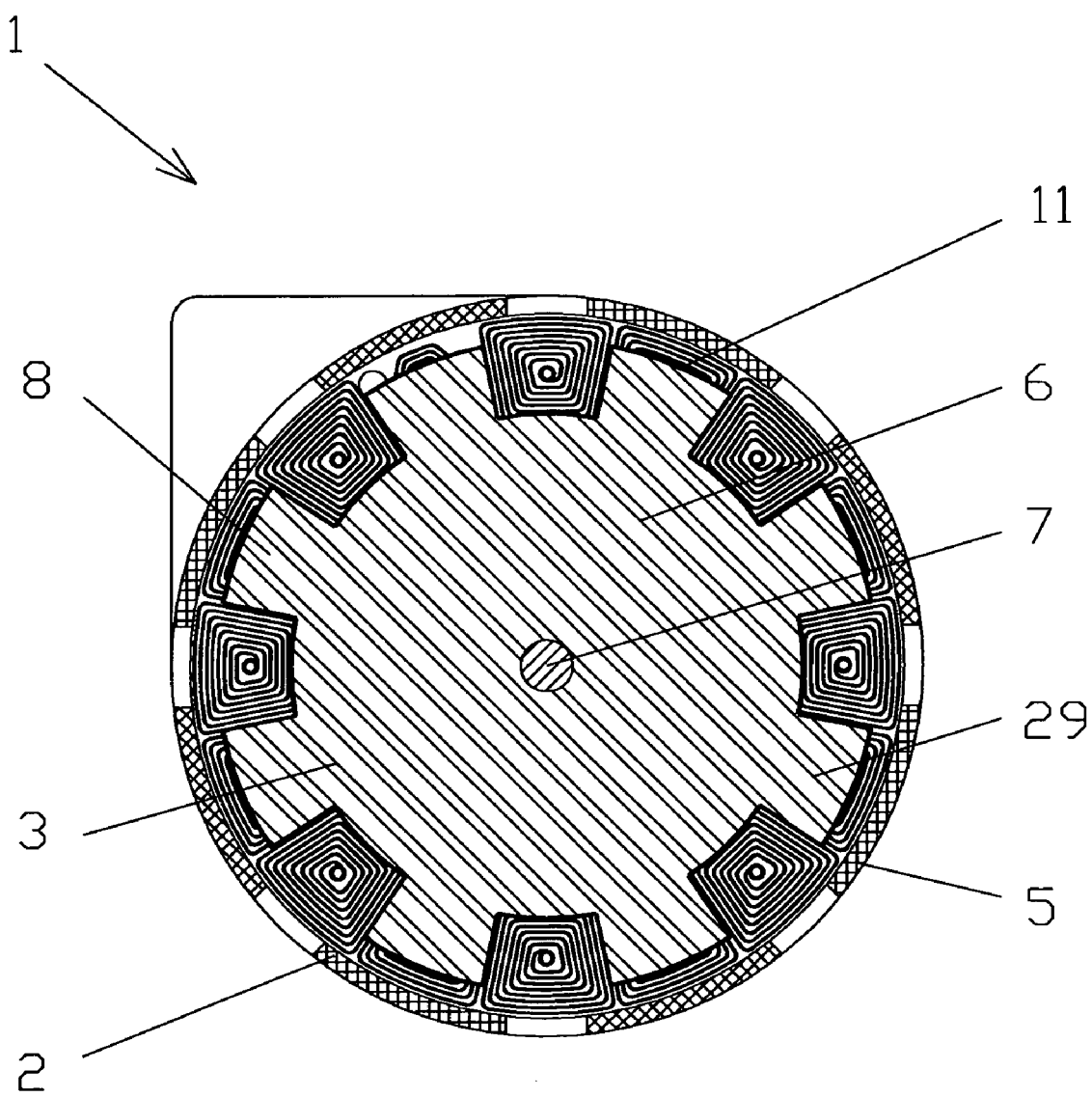
FIG. 4 is a sectional viewpoint A—A of the electric motor illustrated in FIG. 3.

FIG. 4 illustrates a sectional viewpoint A—A of the motor in FIG. 3. The outline of every other coil winding 11 on a circuit board 5 aligns directly with each magnet 29 on disk 6. Every adjacent pole on one side of the disk 6 has the same magnetic polarity.

The uni-polar magnetic rotor 3 has a maximum number of magnetic poles 8 equal to half of the number of the coil windings 11 on one circuit board 5 as illustrated in FIG. 4.

This magnetic poles 8 configuration allows for the maximum magnetic interaction between the magnetic rotor 3 and the stator 4.

Motor Description

FIG. 3 illustrates a brushless DC electric motor 1 comprising a magnetic rotor 3, stator 4 and housing 2. The magnetic rotor 3 is comprised of a disk 6 installed perpendicularly to its rotating shaft 7 and having circumferentially arrayed magnetic poles 8 and 8a. The magnetic poles 8 and 8a on each side of the disk 6 have opposite magnetic polarities.

The stator 4 is comprised of two parallel circuit boards 5 each having circumferentially arrayed coil windings 11 and 11a. Each of the coil windings 11 and 11a on the two circuit boards 5 share a common axis 30 that is parallel to the shaft 7. The opposing stator coil windings 11 and 11a, on the two circuit boards 5, have opposite magnetic polarities with respect to one another.

FIG. 4 illustrates a sectional viewpoint A—A of the motor in FIG. 3. The coil windings 11 are aligned in a radial direction around the shaft 7 and at least partially align in a radial direction with the magnets 29. This alignment allows for magnetic interaction between the magnetic poles 8, 8a and the coil windings 11, 11a respectively.

In FIG. 3 the housing 2 also comprises circuit boards 5 and bearing supports 22. The housing 2 maintains alignment between disk 6 and circuit boards 5 and provides for attachment of bearing supports 22. Bearing supports 22 holds bearings 21 allowing disk 6 and shaft 7 to rotate freely. The disk 6 maintains alignment between the circuit boards 5 by means of the spacers 23.

Figure 5:
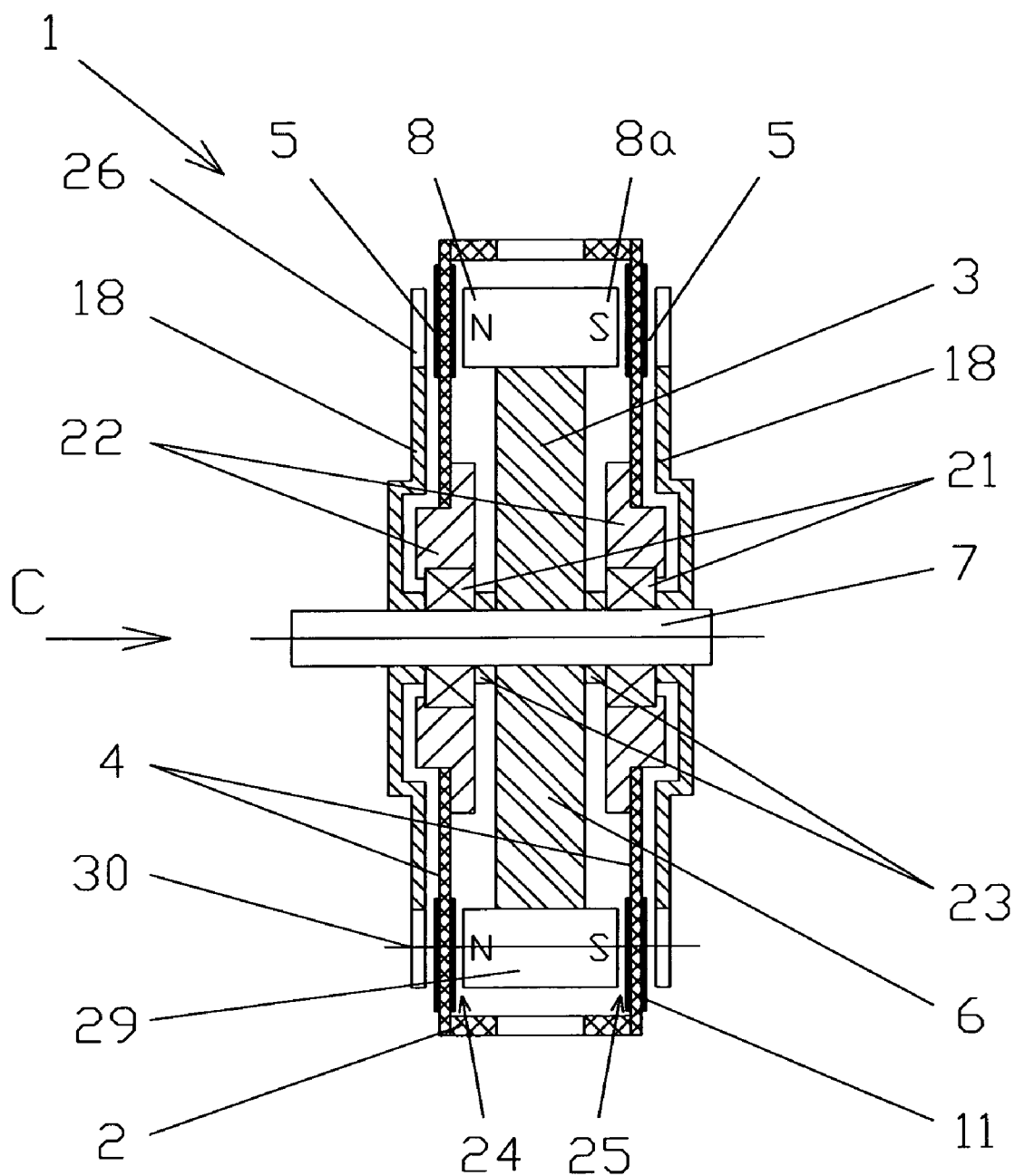
FIG. 5 is a sectional view of the electric motor illustrated in FIG. 3 with ferrous metal plates added.

FIG. 5 is another version of the motor illustrated in FIG. 3. The exact same motor 1 is used with the addition of ferrous metal plates 18 attached solidly to the shaft 7 outside each circuit board 5. Plates 18 with the radial teeth 26 rotate in unison with the disk 6 shortening and thereby concentrating the magnetic flux paths of the magnetic poles 8 and 8a through the coil windings 11 and 11a respectively to each adjacent disk tooth 26. This results in a more efficient motor design.

Figure 6:
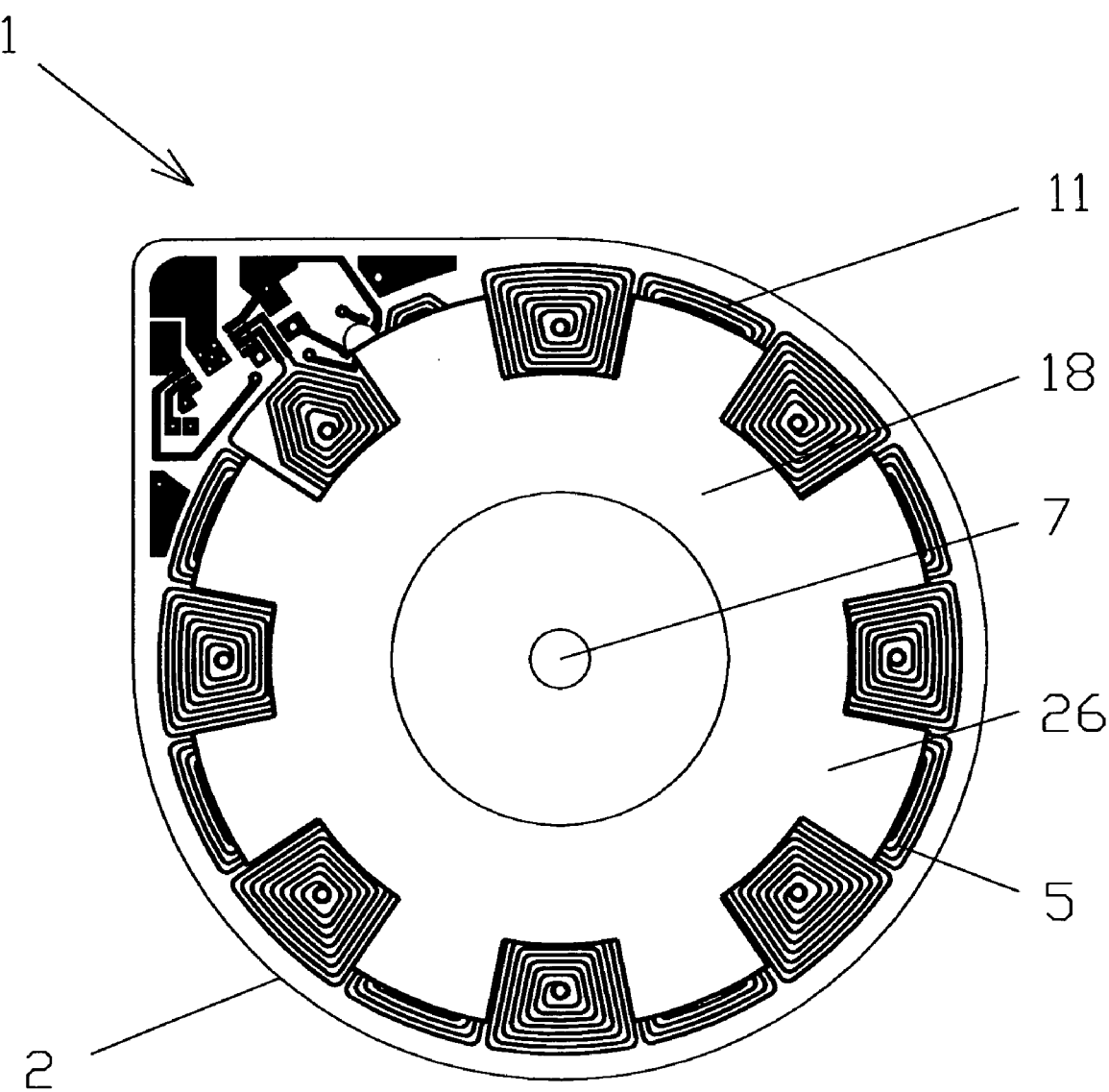
FIG. 6 is a viewpoint C of the electric motor illustrated in FIG. 5.

FIG. 6 illustrates viewpoint C of the motor illustrated in FIG. 5. The coil windings 11 are aligned in a radial direction around the shaft 7 and at least partially aligned in a radial direction with teeth 26. This alignment allows for magnetic interaction between the magnetic poles 8 and the coil windings 11, respectively.

Figure 7:
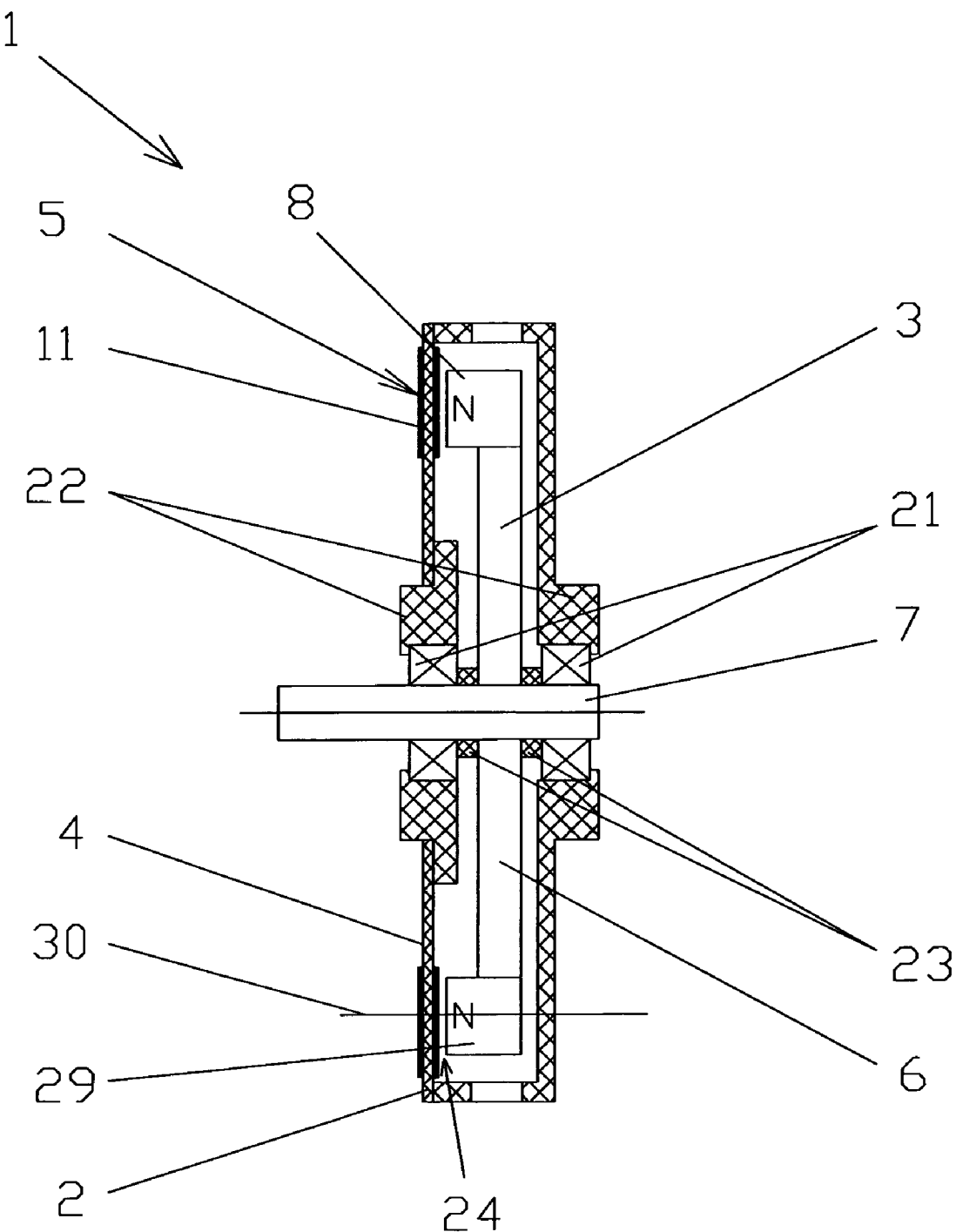
FIG. 7 is a sectional view of another version of the electric motor illustrate in FIG. 3 having a single circuit board.

FIG. 7 is a sectional view of a single circuit board version of the motor illustrate in FIG. 3. This motor 1 has only one circuit board 5; otherwise it is the same as the motor described in FIG. 3.

Integrated Motor/Blower

The unique construction of this motor design makes it very suitable to function as a motor/blower 32 combination. The magnetic rotor 3/blower impeller 19 will serve as both the magnetic rotor 3 and blower impeller 19 for moving fluids. This integrated motor/blower 32 operates the same as the electric motor 1 described in FIG. 3 with the following exceptions:

1. The magnetic rotor 3 is fashioned into the shape of the blower impeller 19 based on the particular application required for the device. (Examples might include crossflow fans, centrifugal blowers, or liquid pumps that include sealless and explosion-proof types).

Note: Since the magnetic rotor 3 will function as the magnetic drive and air-moving device, special considerations for optimizing performance on both of these parameters is required.

2. The motor/blower housing 2 must be constructed to constrain and direct the fluid flow paths as required.

Figure 8:
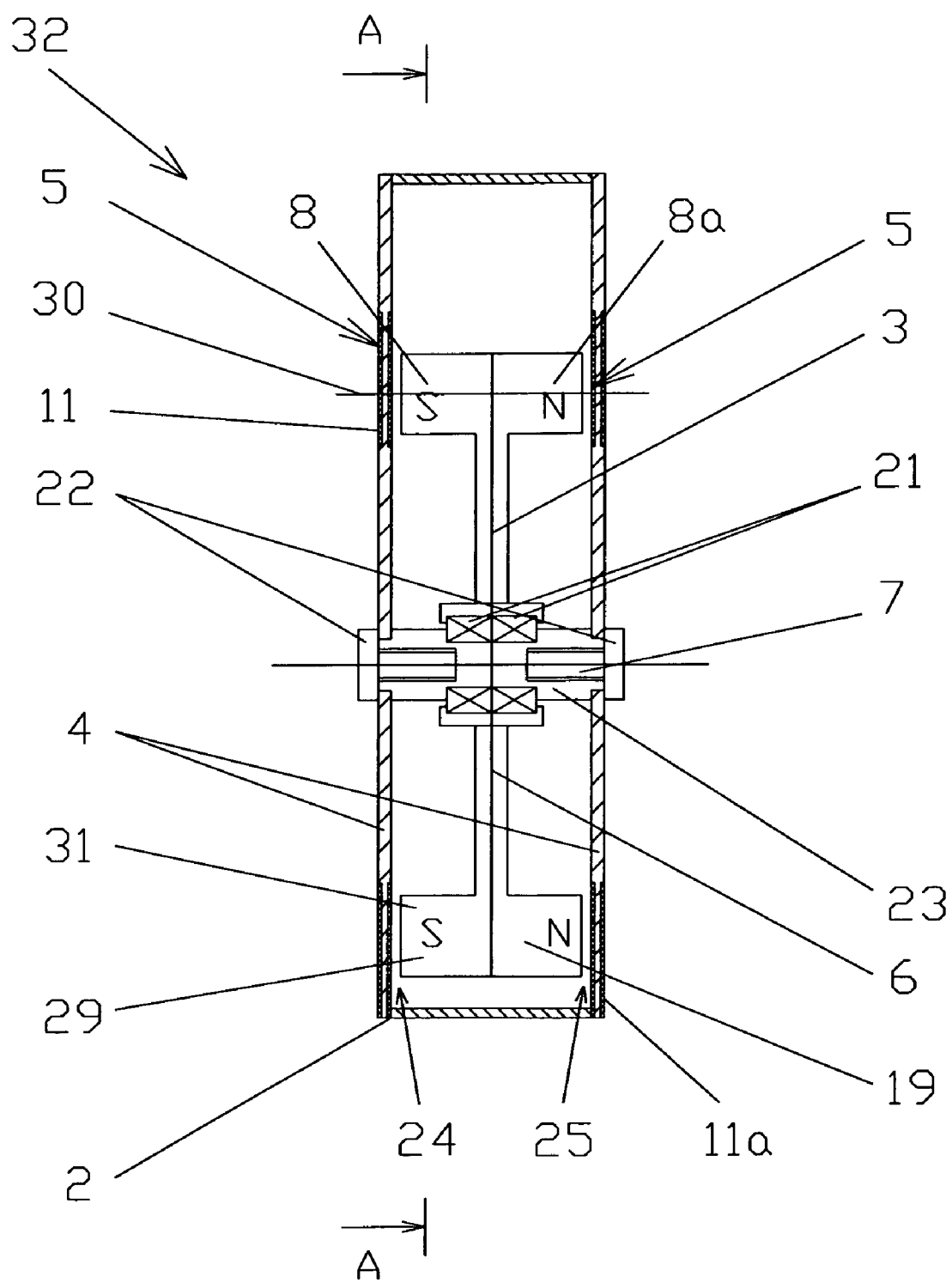
FIG. 8 is a sectional view of an integrated motor/blower.

FIG. 8 illustrates a sectional view of an integrated motor/blower 32 comprising a magnetic rotor 3/blower impeller 19, stator 4 and housing 2.

The magnetic rotor 3/blower impeller 19 is comprised of a disk 6 installed perpendicularly to the shaft 7 and having circumferentially arrayed impeller blades 31 and magnetic poles 8, 8a shaped as impeller blades 31. The magnetic poles 8 and 8a on each side of the magnetic rotor 3/blower impeller 19 have opposite magnetic polarities.

The stator 4 is comprised of two parallel circuit boards 5 each having circumferentially arrayed coil windings 11 and 11a. Each of the coil windings 11, 11a on the two circuit boards 5 share a common axis 30 that is parallel to the shaft 7. The opposing coil windings 11 and 11a, on the two circuit boards 5, have opposite magnetic polarities with respect to one another.

Figure 9:
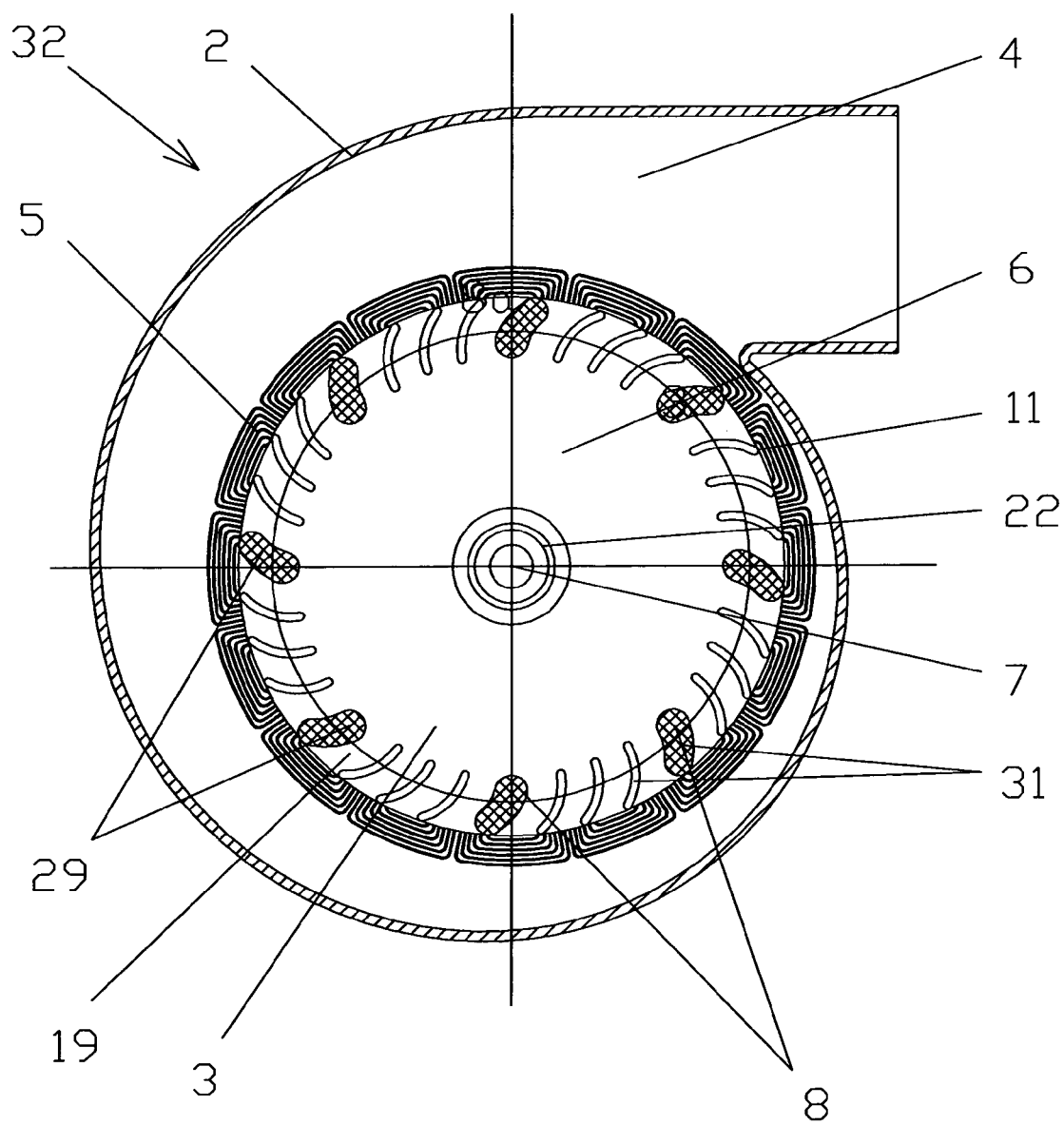
FIG. 9 is a sectional viewpoint A—A of the integrated motor/blower illustrated in FIG. 8.

FIG. 9 illustrates a sectional viewpoint A—A of the motor/blower 32 in FIG. 8. The coil windings 11 are aligned in a radial direction around the shaft 7 and at least partially align in a radial direction with the permanent magnets 29. This alignment allows for magnetic interaction between the magnetic poles 8 and the coil windings 11.

In FIG. 8 the housing 2 also comprises circuit boards 5 for the purpose of constraining and directing fluids. The housing 2 maintains alignment between magnetic rotor 3/blower impeller 19 and circuit boards 5, which provides for attachment of the shaft 7 and bearing supports 22. The bearing supports 22 hold the shaft 7 to the circuit boards 5. The bearings 21 outer races are attached to the magnetic rotor 3/blower impeller 19, which rotates freely around the shaft 7. The magnetic rotor 3/blower impeller 19 maintains gaps 24 and 25 between the circuit boards 5 by means of the shaft 7 and spacers 23.

Controlling Device

The sensing device used to control commutation of this electric motor is a Hall switch or Hall Element. An optical device may also be used but has limitations caused by interference from ambient light sources. The Hall device is located in close proximity to the magnetic rotor and positioned in respect to the coil windings to achieve proper rotational direction and optimum performance from the electric motor. The electronics can be an H-Bridge Drive or Two Phase-Single Ended Drive. The single ended drive stator requires a differently constructed circuit board. This circuit board requires two groups of coil windings wound in the same direction and having common magnetic polarities. The individual coil windings of one group are series connected and adjacently spaced with the coil windings of the other group. One end of each group of coil windings is connected together and ties to either the positive or negative lead of the motor power supply. If the single ended driver is a Low End Driver, then the connected ends of the coil windings tie to the positive supply; if a High End Driver then they're connected to the negative or ground supply. The other end of each of these two groups ties to the single ended driver. Only one group of coil windings is energized at a time.

There are many versions of Single Ended drives with different protection schemes available; however they all perform essentially the same control function. The H-Bridge Drive has a few advantages over the Single Ended drive as can be seen in the following comparison table.

bridge driver uses to energize the coil windings 11. The energized coil windings 11 move the magnetic pole 8 towards alignment with the attracting coil windings 11 on the circuit board 5. Before the magnetic rotor 3 reaches these coil windings 11, the Hall device senses the magnetic pole 8 and changes the output of the driver causing the magnetic rotor 3 to be attracted to the next or adjacent set of coil windings 11. Before the magnetic pole 8 reaches this set of attracting coil windings 11 the Hall device senses the loss of the magnet pole 8 and changes the output of the driver causing the magnetic pole 8 to be attracted to the next set of coil windings 11. This process continues maintaining a constant motion in one direction on the magnetic rotor 3.

We claim:

1. A brushless DC electric motor comprising a housing, a magnetic rotor and a stator comprising at least one circuit board, wherein:
   (i) said magnetic rotor comprises a disk installed perpendicularly to a shaft and has circumferentially arrayed magnetic poles;
   (ii) said circuit board comprises a controlling device and is located parallel to said disk and serves as a part of said housing;
   (iii) said circuit board on each side comprises one layer of circumferentially arrayed coil windings;
   (iv) said coil windings of each said layer arranged in pairs, each pair a comprising a spiral formed by a start coil winding and an end coil winding, said spiral extending from a center of a start coil winding to a center of an end coil winding, each spiral having the same turn direction relative to each of said centers;
   (v) said layers being the same in transparent view with the pairs of coil windings and shifted angularly in such a way that the centers of said start coil windings on one side of said circuit board coincide and are electrically

| Items for Comparison | H-Bridge Drive | Two Phase Single End Drive |
| --- | --- | --- |
| Circuit Boards coil windings resistance seen by the Controlling Device | Equals the sum of all individual stator coil windings | Equals ½ the sum of all individual stator coil windings |
| Motor Magnetic Drive Operation | Push and Pull | Either Push or Pull |
| Motor efficiency | More efficient than Two Phase Single End Drive | Less efficient than H-Bridge Drive |
| Operational Duty Cycle on Circuit Boards coil windings | 100% | 50% |
| Electrical Attachment Points to Each Circuit Board | 2 | 3 |
| Circuit Board Construction | Requires 1 VIA for each coil windings | Requires 2 VIA'S for each coil windings |

Operational Description

The operation of the electric motor 1 will be briefly described starting with the Hall device through rotation of the disk 6.

The Hall device supplies a change in electrical states or levels used to operate the H-Bridge controller. These states or levels change in relation to the magnetic poles 8 and gap 24 of the disk 6. If the Hall device is not sensing one of the magnetic poles 8, then it supplies output signal that the connected by vias with said centers of said end coil windings on the other side of said circuit board;
   (vi) said magnetic poles having the same magnetic polarity and equal to the number of said pairs of coil windings on the one side of said circuit board;
   (vii) said rotor comprises at least one ferrous metal plate placed parallel to said rotor disk so that said circuit board is located between the disk and the ferrous metal plate.

2. The electric motor according to claim 1, wherein said coil windings are etched in circuit board metal layers.

3. The electric motor according to claim 2, wherein said coil windings are plated with a ferromagnetic coating.

4. The electric motor according to claim 3, wherein said ferromagnetic coating is nickel.

5. The electric motor according to claim 2, wherein said circuit board metal layers are copper.

6. The electric motor according to claim 1, wherein said disk further comprises circumferentially arrayed blades attached to said disk.

7. The electric motor according to claim 6, wherein at least a part of each blade is magnetized in the direction parallel to said shaft.

8. The electric motor according to claim 6, wherein at least a part of said blades is magnetized in the direction parallel to said shaft.

\* \* \* \* \*